United States Patent
Chen et al.

(10) Patent No.: US 7,102,326 B1
(45) Date of Patent: Sep. 5, 2006

(54) MOTOR SPEED VARIATOR AND A DRIVING METHOD THEREOF

(75) Inventors: Yu-Kai Chen, Chiai (TW); Tsai-Fu Wu, Chiai (TW); Wen-Yang Wang, Nantou (TW); Yung-Chun Wu, Kaohsiung (TW); Chin-Hsiung Chang, Taichung (TW)

(73) Assignee: Fego Precision Industrial Co., Ltd., Taichung (TW)

( * ) Notice: Subject to any disclaimer, the term of this patent is extended or adjusted under 35 U.S.C. 154(b) by 0 days.

(21) Appl. No.: 11/198,267

(22) Filed: Aug. 8, 2005

(51) Int. Cl.
*H02P 27/02* (2006.01)

(52) U.S. Cl. .......... 318/807; 318/767; 318/727; 318/606; 318/684; 332/117

(58) Field of Classification Search ........ 318/807, 318/767, 494, 766, 727, 606, 684; 332/117
See application file for complete search history.

(56) References Cited

U.S. PATENT DOCUMENTS

| | | | | |
|---|---|---|---|---|
| 3,694,718 A * | 9/1972 | Graf et al. | ........ | 318/811 |
| 3,971,972 A * | 7/1976 | Stich | ........ | 318/811 |
| 4,024,444 A * | 5/1977 | Dewan et al. | ........ | 318/805 |
| 4,123,692 A * | 10/1978 | Gilmore et al. | ........ | 363/41 |
| 4,689,543 A * | 8/1987 | Hucker | ........ | 318/798 |
| 5,184,057 A * | 2/1993 | Sakai et al. | ........ | 318/803 |
| 5,189,412 A * | 2/1993 | Mehta et al. | ........ | 340/825.22 |
| 5,214,367 A * | 5/1993 | Uesugi | ........ | 318/803 |
| 5,252,905 A * | 10/1993 | Wills et al. | ........ | 318/807 |
| 5,345,160 A * | 9/1994 | Corniere | ........ | 318/811 |
| 5,500,581 A * | 3/1996 | Hatanaka et al. | ........ | 318/727 |
| 5,592,058 A * | 1/1997 | Archer et al. | ........ | 318/254 |
| 5,994,869 A * | 11/1999 | Becerra | ........ | 318/729 |

* cited by examiner

*Primary Examiner*—Rita Leykin
(74) *Attorney, Agent, or Firm*—Troxell Law Office, PLLC

(57) ABSTRACT

A motor variator and a driving method thereof are provided for controlling the operating speed of a fan, which employ an alternate current chopper to change the working cycle and the rotary speed of a stepless motor. The motor variator includes a high-frequency alternate current chopper connected to an induction coil of an induction motor, an alternate current power supply connected to the high-frequency alternate current chopper and a controller connected to the high-frequency alternate current chopper for outputting a switch signal to the high-frequency alternate current chopper, such that the high-frequency alternate current chopper is controlled by the switch signal to perform a chopper action for the alternate current power supply and output a drive voltage, so as to change the rotary speed of the induction motor.

7 Claims, 6 Drawing Sheets

MOTOR SPEED VARIATOR AND A DRIVING METHOD THEREOF

BACKGROUND OF THE INVENTION

1. Field of the Invention

The present invention relates to a motor speed variator and a driving method thereof, and more particularly to a motor speed variator and a driving method thereof for controlling the operating speed of a fan.

2. Description of Related Art

In the present wireless remote control fan speed variation systems, different capacitances are used for achieving a step-down function and a voltage for controlling a motor, so as to achieve the function of changing the operating speed of the fan. However, this method is restricted by the parameters of the motor. If a same capacitance goes with different motors, then these motors will have different rotary speeds, and thus it will be difficult for users to choose an appropriate capacitance for a future upgrade of a fan system originally having no speed variation function. The fans of this sort have significant impact on the DIY market. As to manufacturers, different motors with different capacitances are required and create some difficulty for the production of motors as well as a burden of carrying the inventory of components. As to functions, it is not feasible to lower the voltage by using different capacitors to achieve the stepless speed variation function because of the cost and size of the integrated circuits.

A remote control fan speed variation system as described below uses an industrial hanging fan for example and illustration. Industrial hanging fans have been used extensively since the 1950's, and the sale of hanging fans in Europe and America peaked in the 1970's. Active exports also brought a breakthrough to the hanging fan development, and revolutionary hanging fan products come with air conditioning, indoor illumination, and accelerated air cooling functions; and thus such hanging fans are protected by patents and have become an indispensable product for domestic life.

Since the hanging fan has become an integral part of our life and our living quality is thereby increased, the stability, safety, comfort of use, and control of the hanging fan have become main factors for consideration. Development of a stable and high-quality hanging fan system is a subject for manufacturers to provide tremendous convenience and comfort to users. The development technology is advanced, but the way of achieving the stepless speed variation, remote control and low noise for the rotation of the hanging fans has become a major issue of the product. Although there are brushless DC (BLDC) motor related products in the Japan market that can achieve the foregoing functions, they are very expensive. The traditional hanging fan speed variation system can be implemented by the following ways:

1. The concept of using a coupled transformer on a wall for the control is adopted to achieve a stepless speed variation function, but its volume is too large, and such method is generally used in developing countries such as India.

2. Different coils are used for a motor to achieve a step speed variation function, and such method usually comes with three speeds. However, the winding of the motor is complicated, and the motor produces noise due to the imbalanced coil of the motor. This method is commonly used in Taiwan.

3. The voltage of different capacitors is reduced to achieve the speed variation function, and thus the voltage of the motor will be changed, and the speed variation speed can be achieved. However, such method cannot achieve the stepless speed variation function.

4. The thyristor of an alternating silicon controlled switch (TRIAC) is used to modulate the phase of the voltage, so that the rotary speed of the motor can be controlled. This method also produces noise and cannot be used for a low-speed operation.

The aforementioned four methods used in the industry not only increase the volume of the product, but also fail to achieve the stepless speed variation or eliminate noise.

SUMMARY OF THE INVENTION

Therefore, it is a primary objective of the present invention to provide a motor speed variator for controlling the operating speed of a fan system, which uses an alternate current chopper model to change a working cycle for the stepless speed variation function of a motor of the fan system.

The present invention used for varying the speed of an induction motor with an induction coil connects a high-frequency alternate current chopper with the induction coil of the induction motor, while the high-frequency alternate current chopper is connected separately to an alternate current power supply and a controller. The controller outputs a switch signal to the high-frequency alternate current chopper, so that the high-frequency alternate current chopper is controlled by the switch signal to perform a chopper action for the alternate current power supply and then output a drive voltage to change the rotary speed of the induction motor. Therefore, changing the working cycle of the switch signal controls the time for the high-frequency alternate current chopper to perform a chopper action for the alternate current power supply, and further output different drive voltages to the induction motor, to control the operating speed of the motor.

The invention further comprises a wireless transmission module connected to the controller for obtaining a digital control code transmitted from a remote end and controlling a switch signal output from the controller. The digital control code is output from a wireless remote control at a remote end.

The invention employs a control method of a high-frequency alternate current chopper to improve the noise problem produced when the fan system is operated at a low speed. At present, such a product has not been introduced to the market. Further, the present invention also uses a wireless transmission module to achieve the remote control function of the fan system, and the remote control function of the fan system is divided into two types: a radio frequency (RF) remote control and an infrared (IR) remote control.

To make it easier for our examiner to understand the objective of the invention, its structure, innovative features, and performance, we use a preferred embodiment with the attached drawings for the detailed description of the invention. However, the drawings are provided for reference and description only, but not intended for limiting the present invention.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The above and other objects, features and advantages of the present invention will become apparent from the following detailed description taken with the accompanying drawings. However, the drawings are provided for reference and illustration, but not intended to limit the present invention.

Figure 1:
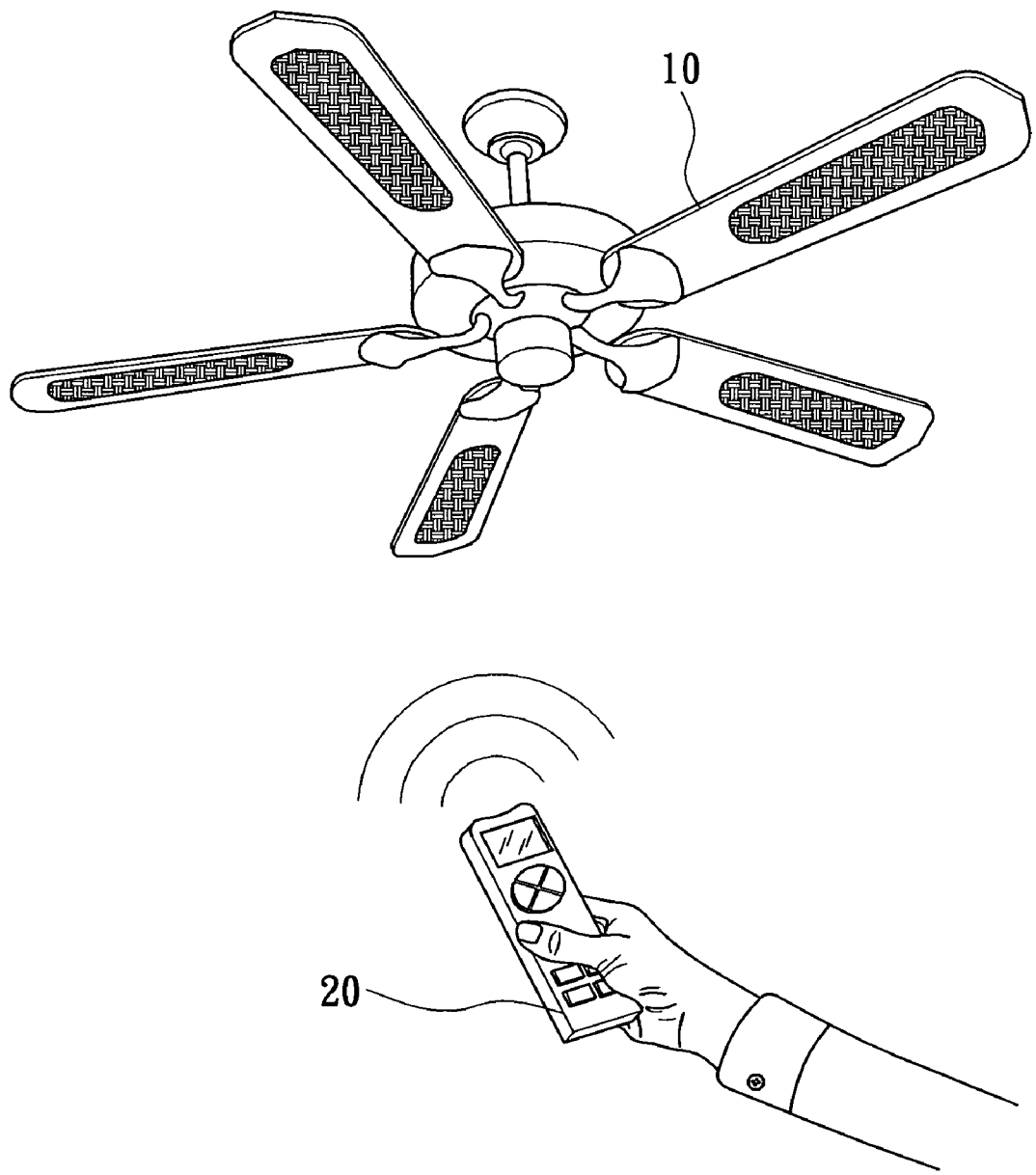
FIG. 1 is a schematic view of the environment for using the present invention.

Reference is made to FIG. 1 for the schematic view of the environment of using the present invention. Users can control the operation and function of a fan system 10 by a wireless remote control 2, such as turning on or off the power to operate or stop the fan system, or changing the speed of the fan system during its operation.

Figure 2:
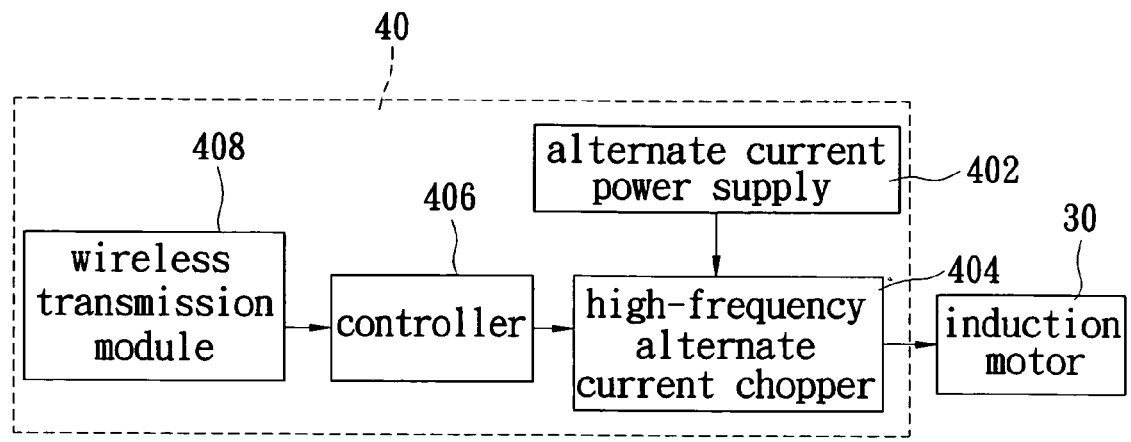
FIG. 2 is a schematic circuit block diagram of the present invention.

Reference is made to FIG. 2 for a schematic circuit block diagram of the present invention. The motor speed variator 40 of the invention uses an induction motor 30 with an induction coil to change the speed of a motor and comprises a high-frequency alternate current chopper 404 connected to the induction coil of the induction motor 30 and an alternate current power supply 402, such that a controller 406 connected to the high-frequency alternate current chopper 404 outputs a switch signal to the high-frequency alternate current chopper 404, and the high-frequency alternate current chopper 404 is controlled by the switch signal to perform a chopper action for the alternate current power supply 402 and then output a drive voltage for changing the rotary speed of the induction motor. Therefore, the present invention can make use of the controller 406 to output and change the working cycle of the switch signal and control the time for the high-frequency alternate current chopper 404 to perform a chopper action for the alternate current power supply 402 and further output different drive voltages to the induction motor 30 to control its rotary speed. If the high-frequency alternate current chopper 404 complies with the parameters of the motor and comes with an appropriate capacitance C1, then a high power factor effect can be achieved.

In the description above, the present invention further uses a wireless transmission module 408 to connect with the controller 406 for obtaining a digital control code (not labeled in the figure) from a remote end to control the controller 406 to output the switch signal. Referring to FIG. 1, the digital control code is transmitted and output from the wireless remote control 20 at a remote end. The wireless remote control 20 transmits the digital control code by infrared remote control technology or radio frequency remote control technology. The motor speed variator 40 of the present invention can be used for a fan system, a household fan system, or an air conditioning fan system.

Figure 3:
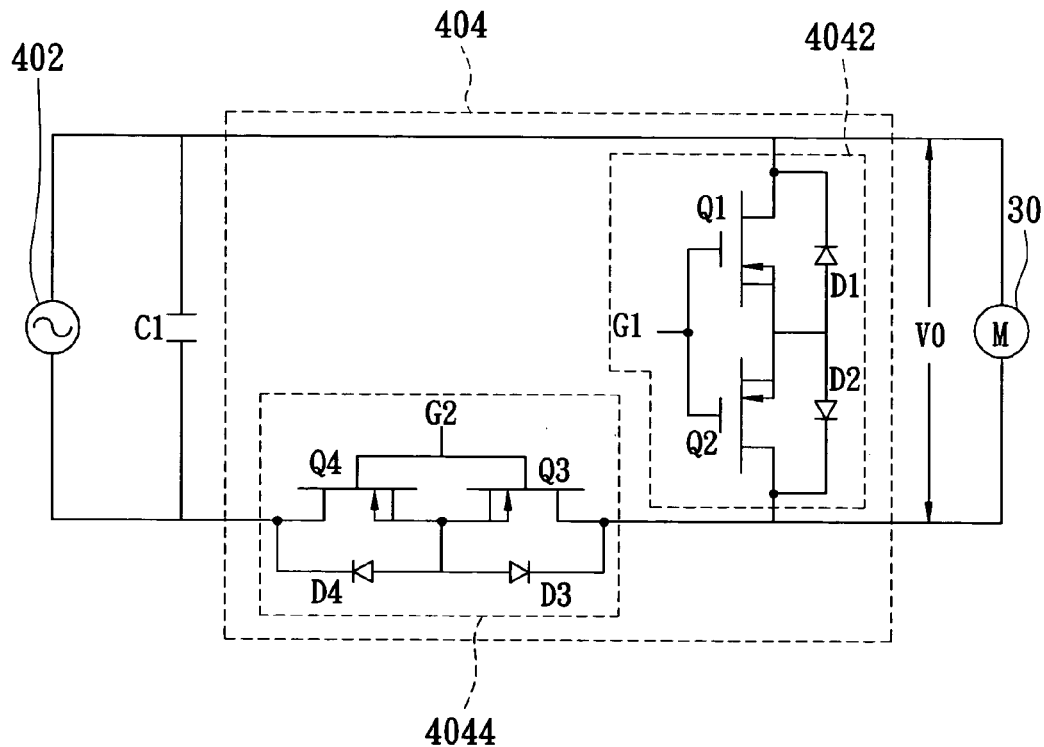
FIG. 3 is a schematic circuit diagram of a high-frequency chopper circuit of the present invention.

Reference is made to FIG. 3 for a schematic circuit diagram of a high-frequency alternate current chopper circuit of the present invention. Also referring to FIG. 2, the high-frequency alternate current chopper 404 is coupled to the alternate current power supply 402 and the induction motor 30, and the high-frequency alternate current chopper 404 is comprised of two, two-way switches connected to each other and controlled by the switch signal output by the controller 406. The two-way switch is comprised of two power switches and two fast diodes; the gates of the two power switches are connected to a control end, the sources are connected to the cathode of the two fast diodes, and the cathode of the two fast diodes is connected to the drains of the two power switches, respectively.

In FIG. 3, the gates of the two power switches Q1, Q2 of the first two-way switch 4042 are connected separately to a control end G1; the sources are connected respectively to the cathodes of the two fast diodes D1, D2; and the anodes of the two fast diodes D1, D2 are connected respectively to the drains of the two power switches Q1, Q2. The gates of the two power switches of the second two-way switch 4044 are connected separately to a control end G2; the sources are connected respectively to the cathodes of the two fast diodes of D3, D4; and the anodes of the two fast diodes D3, D4 are connected respectively to the drains of the two power switches Q3, Q4.

In the description above, the sources of the power switches Q2, Q3 are connected with each other and also connected to the an end of the induction coil of the induction motor 30. The other end of the induction coil is connected to the source of the power switch Q1. In the meantime, the source of the power switch Q1 is connected to an end of the alternate current power supply 402, and another end of the alternate current power supply 402 is connected to the source of the power switch Q4. Further, the control ends G1, G2 are connected separately to the controller 406 for receiving the control of the switch signal output by the controller 406. The control of the switch signal is used to change the connecting time of the power switches to perform a chopper action for the alternate current power supply 402, and then output a drive voltage Vo. By changing the magnitude of the drive voltage Vo, the rotary speed of the induction motor 30 can be changed. The drive voltage Vo consists of several sine wave voltages of different frequencies, while the induction motor is a low pass filter by itself. Therefore, the induction motor 30 filters the excessively high frequency of the sine wave voltage and only leaves the sine wave voltage of the required frequency for the operation of the induction motor 30.

Figure 4:
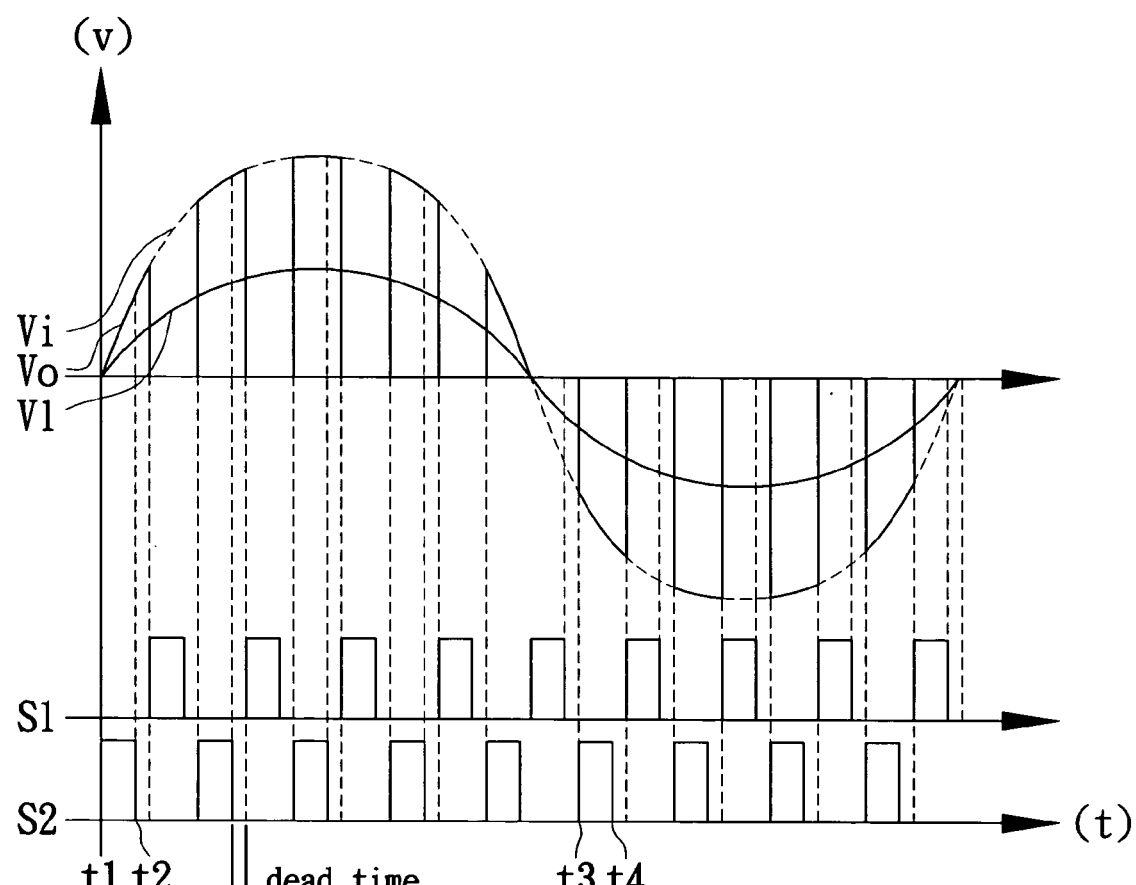
FIG. 4 is a schematic diagram of each voltage waveform and switch signal waveform of the present invention.

Referring to FIGS. 3 and 4 for the schematic views of each voltage waveform and switch signal waveform in accordance with the present invention, the y-axis represents voltage (v) and the x-axis represents time (t). The switch signals S1, S2 are transmitted respectively to the control ends G1, G2, and the switch signals must have an opposite phases, and there must be a dead time between the two signals to prevent the power switch from being burned or damaged due to a short circuit. Further, the input waveform of the alternate current power supply is Vi. After the high-frequency alternate current chopper 404 performs a chopper action for the alternate current power supply Vi, a drive voltage Vo will be produced. The average voltage of the drive voltage has a waveform V1. The induction motor 30 changes its rotary speed according to the magnitude of the average voltage V1. Therefore, the working cycle of the switch signals is changed to control the high-frequency alternate current chopper 404 to perform a chopper action for the alternate current power supply Vi, and further output different drive voltages Vo to the induction motor 30 to control its rotary speed.

Figure 5A:
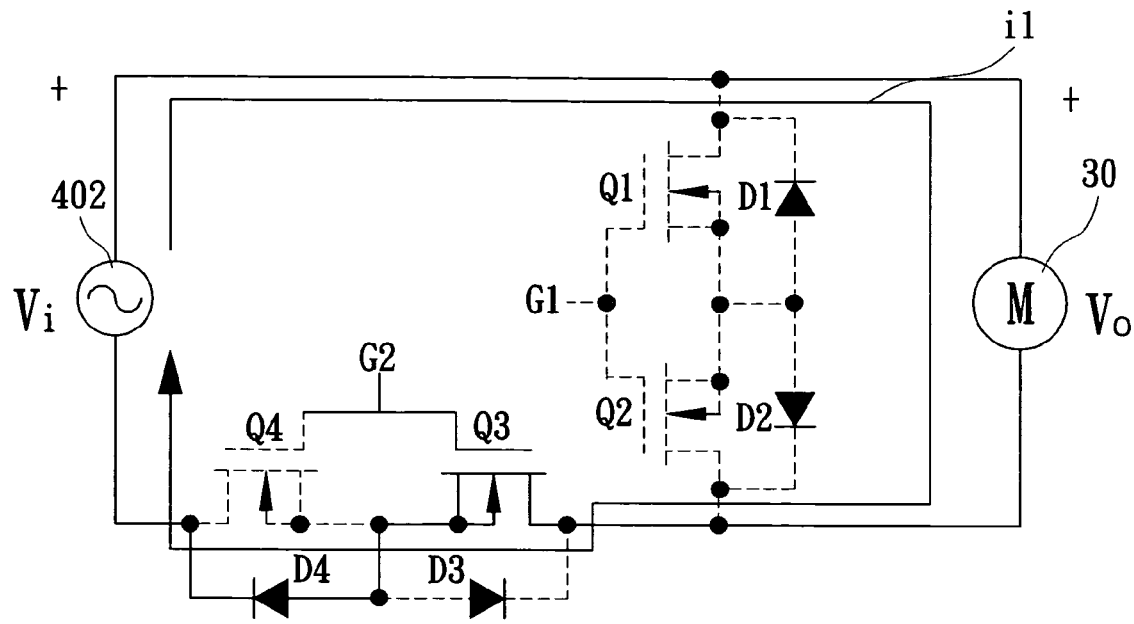
FIGS. 5A to 5D are schematic circuit diagrams of a high-frequency alternate current chopper of the present invention.

Reference is made to FIGS. 4 and 5A to 5D for a schematic circuit diagram of four states of the high-frequency alternate current chopper 404 in accordance with the present invention. The chopper action for the high-frequency alternate current is divided into the four states as described below:

State 1 (Time t=Time t1): The input of the alternate current power supply Vi is a positive half cycle; by then the switch signal S1 controls the control end G1 to be disconnected, and the switch signal S2 controls the control end G2 to be connected. In FIG. 5A, the current i1 passes through the path of the induction motor 30, the switch power Q3 and the fast diode D4. Therefore, the whole alternate current power supply Vi is reflected onto the induction motor 30.

Figure 5B:
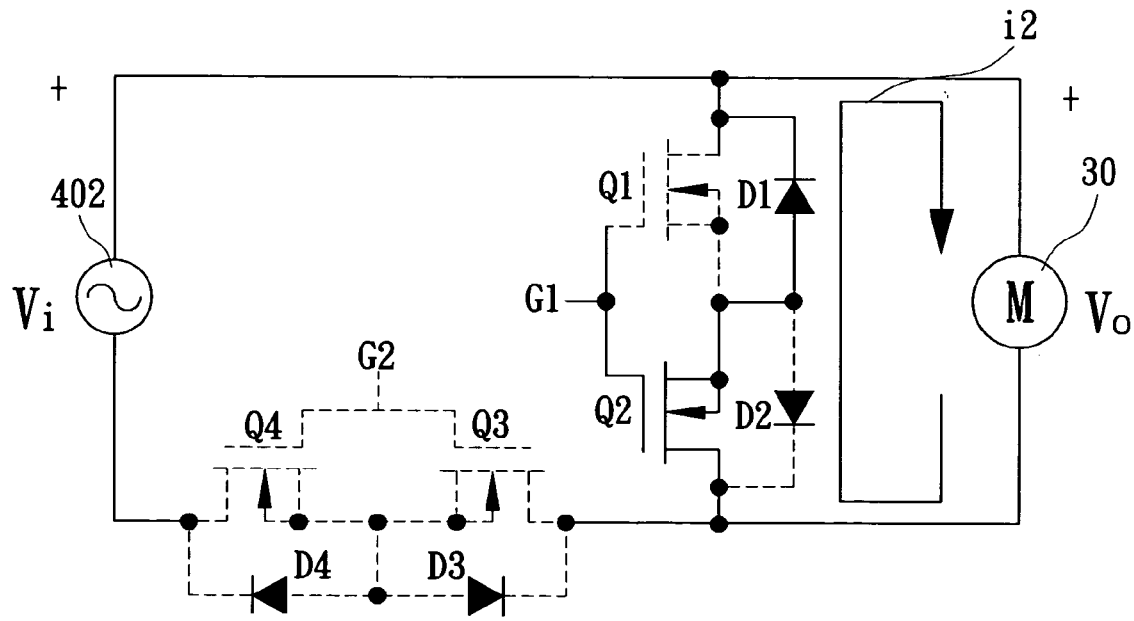

State 2 (Time t=Time t2): The input of the alternate current power supply Vi is a positive half cycle; by then the switch signal S1 controls the control end G1 to be connected, and the switch signal S2 controls the control end G2 to be disconnected. In FIG. 5B, this state considers the power switch Q2 and the fast diode D1 as a fly wheeling diode, because the induction motor 30 has a negative capacitance load. Therefore, it is necessary to have a continuous connection path for the current i2 of the induction motor 30 to prevent excessively high current variation (e=l×di/dt) to burn or damage the power components connected in series on the path.

Figure 5C:
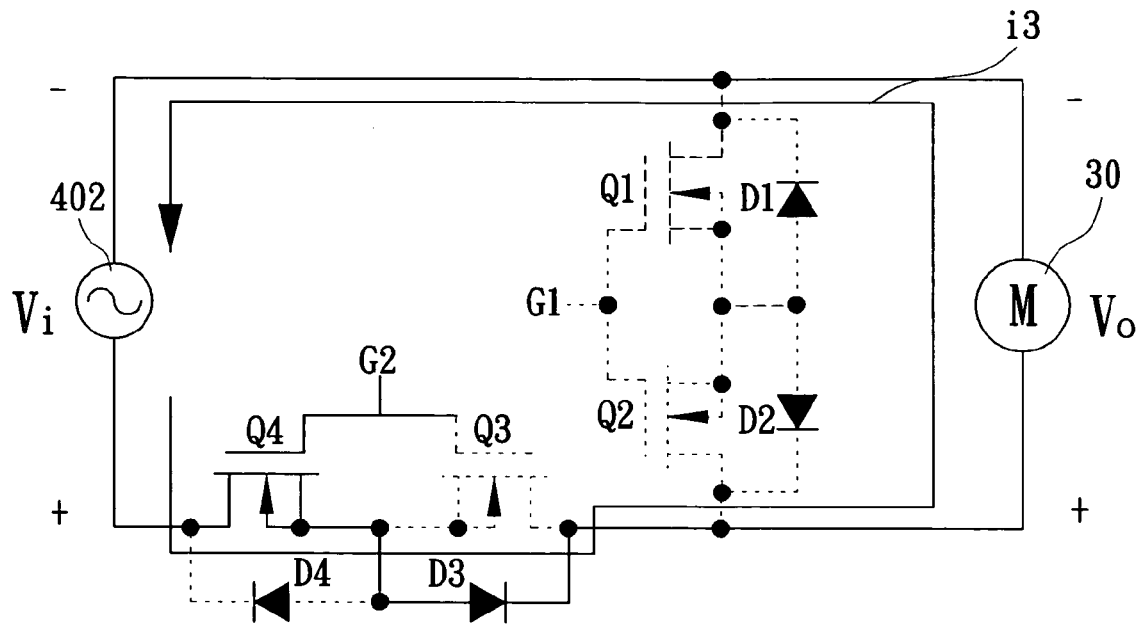

State 3 (Time t=Time t3): The input of the alternate current power supply Vi is a negative half cycle; the switch signal S1 controls the control end G1 to be disconnected, and the switch signal S2 controls the control end G2 to be connected. In FIG. 5C, the current i3 passes through the path of the power switch Q4, the fast diode D3 and induction motor 30. Therefore, the whole alternate current power supply Vi is reflected onto the induction motor 30.

Figure 5D:
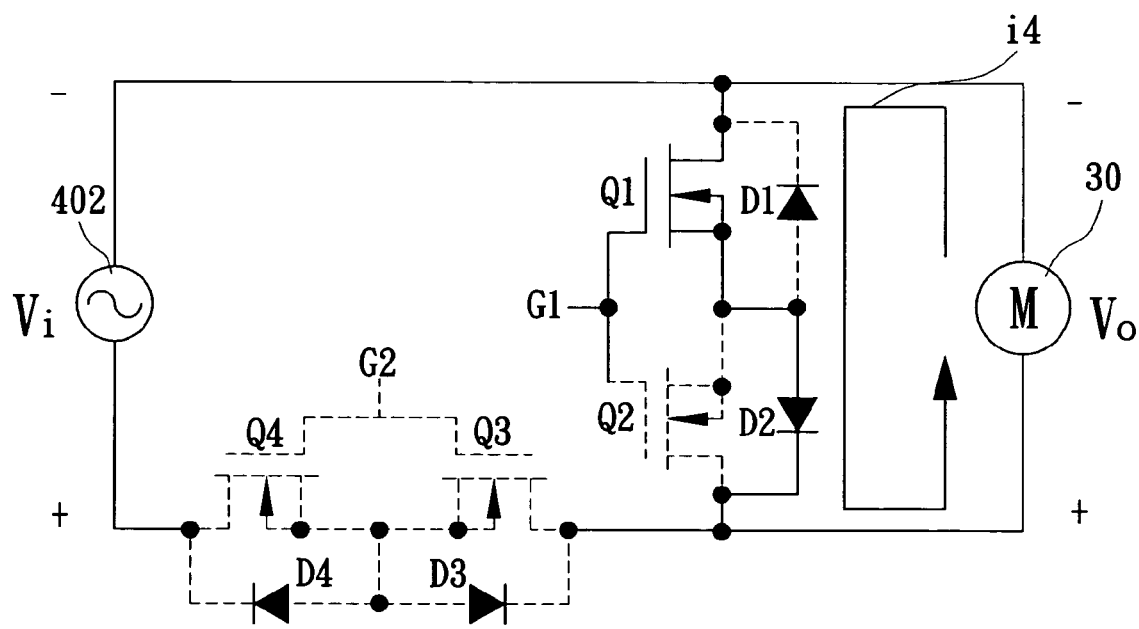

State 4 (Time t=Time t4): The input of the alternate current power supply Vi is a negative cycle; the switch signal S1 controls the control end G1 to be disconnected, and the switch signal S2 controls the control end G2 to be connected. In FIG. 5D, this state uses the power switch Q1 and the fast diode D2 as a fly wheeling diode to make the current i4 of the induction motor 30 have the continuous connection path and prevent excessively high current variation (e=l×di/dt) that burns or damages a power device connected in parallel and located on the path of the power device.

Figure 6:
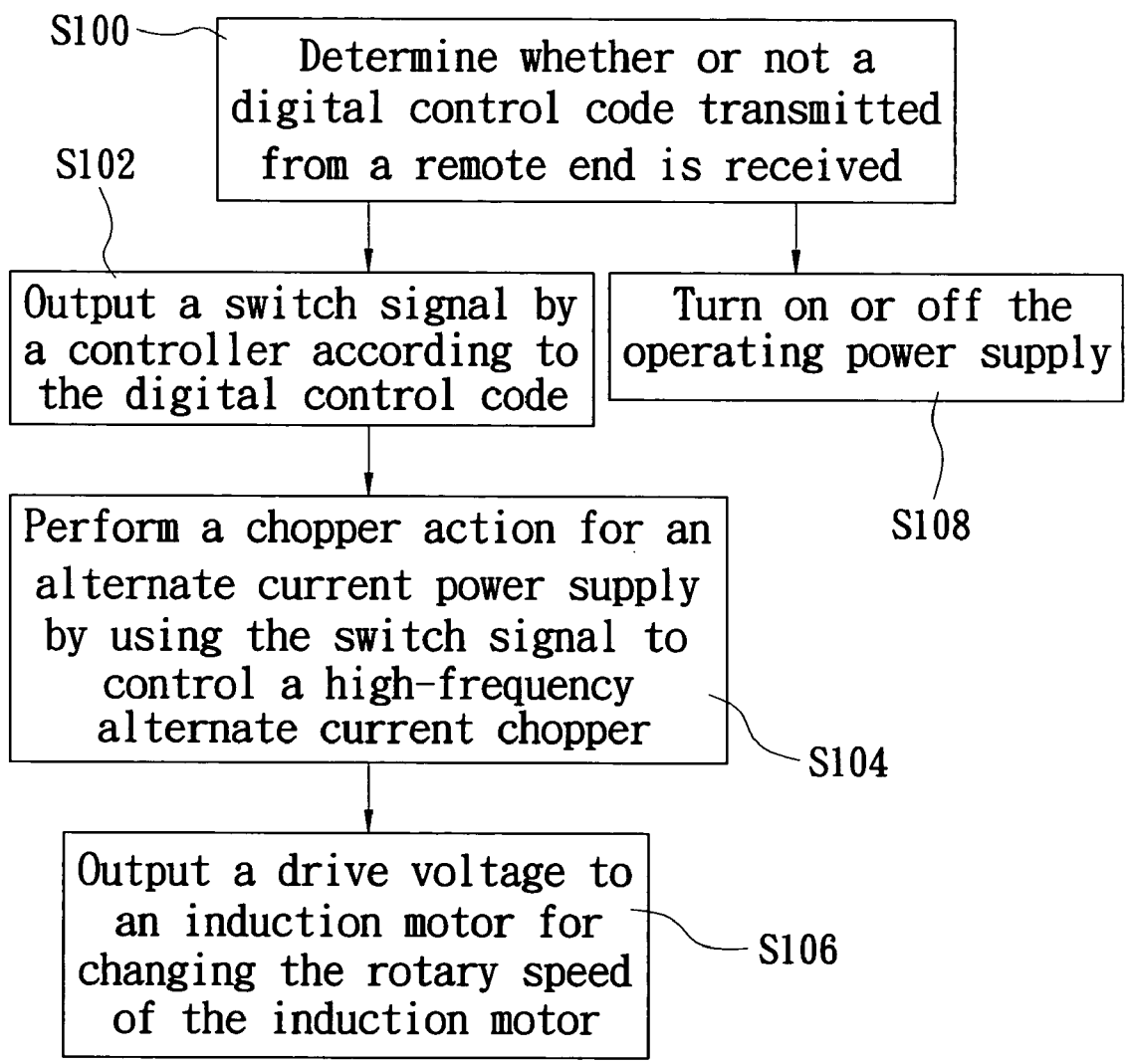
FIG. 6 is a flow chart of the driving method of a motor variator of the present invention.

Reference is made to FIG. 6 accompanied with FIG. 2 for the flow chart of the motor speed variation of a motor in accordance with the present invention. The procedure includes the following steps. Whether or not a digital control code transmitted from a remote end is received by a wireless transmission module 408 is determined (S100). A switch signal is output by a controller 406 according to the digital control code (S102). A chopper action is performed for the alternate current power supply 402 by using the switch signal to control a high-frequency alternate current chopper 404 (S104). The high-frequency alternate current chopper 404 is used to adjust and output the output of the drive voltage to the induction motor 30 according to the working cycle of different switch signals (S106). If the working cycle of the switch signal is increased as described in the step (S104) of performing a chopper action for the alternate current power supply, the drive voltage rises and the rotary speed of the motor increases, and if the working cycle of the switch signal is decreased, the drive voltage drops and the rotary speed of the motor decreases. A step of turning on or off the working power supply is included after the step (S100) of determining whether or not a digital control code transmitted from a remote end is received as a control of operating or stopping a motor (S108).

The control unit 406 and the wireless transmission module 408 of the present invention are primarily single chips, and also integrate the high-frequency alternate current chopper 404 to implement its remote control fan function. In the present fan speed control applications, a single phase AC induction motor is used, but the existing single phase induction motor used for the fan speed control usually has noise produced at a low operating speed. Therefore, the present invention adopts a control method of the high-frequency alternate current chopper 404, and thus the noise of the fan operated at a low speed can be eliminated. At present, this product has not been introduced in the market. In addition, the remote control of the remote control products is divided into a radio frequency (RF) and infrared (IR), and other functions are described as follows:

1. It comes with a remote control function.
2. There are 8 operating speeds of the fan (which can be expanded to N speeds).
3. The product is completely silent for low-speed operations.
4. The fan can rotate clockwise or counterclockwise.
5. The fan has a sleep mode, and the operating speed of the operating speed of the fan can drop from the initial set speed to a minimum low speed every half hour.
6. The fan has a natural wind function and a total of 6 speeds for its operating time.
7. A single-chip microprocessor is used flexibly to carry out each function, including an automatic reduction of the speed for every half hour when the fan is in the sleep mode. The functions of the 6-speed natural wind and turning off a lamp can be carried out after an automatic delay of 30 seconds.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor speed variator, for varying a speed of an induction motor having an induction coil, said motor speed variator comprising:

a high-frequency alternate voltage chopper, coupled to said induction coil of said induction motor, said high-frequency alternate voltage chopper is formed by coupling two, bi-directional switches, wherein said bi-directional switch is comprised of two power switches and two fast diodes, gates of said two two-way power switches are coupled to define a control end, sources of said two two-way power switches are coupled to cathodes of said two fast diodes, and anodes of said two fast diodes are coupled separately to drains of said two power switches;

an alternate current power supply, coupled to said high-frequency alternate voltage chopper; and a controller, coupled to said high-frequency alternate voltage chopper for outputting a switch signal to said high-frequency alternate voltage chopper;

wherein said high-frequency alternate voltage chopper is controlled by said switch signal for a switch, and said switch of said two, bi-directional switches perform a chopper action for said alternate current power supply and then output a drive voltage to change a rotary speed of said induction motor.

2. The motor speed variator of claim 1, applied in a system selected from a group consisting of a hanging fan system, a household fan system, and an air conditioning fan system.

3. The motor speed variator of claim 1, further comprising a wireless transmission module coupled to said controller for obtaining a digital control code transmitted from a remote end and controlling said controller to output said switch signal.

4. The motor speed variator of claim 3, wherein said control digital code is transmitted from a wireless remote control at a remote end.

5. The motor speed variator of claim 4, wherein said wireless remote control transmit said control digital code by infrared remote technology.

6. The motor speed variator of claim 4, wherein said wireless remote control transmits said control digital code by radio frequency remote technology.

7. The motor speed variator of claim 1, further comprising a power factor capacitor coupled to said alternate current power supply for improving a power factor of said motor speed variator.

* * * * *